(12) United States Patent
Yamamoto

(10) Patent No.: US 6,560,191 B1
(45) Date of Patent: May 6, 2003

(54) LASER OUTPUT CONTROL IN OPTICAL DISK RECORDING/REPRODUCING DEVICE

(75) Inventor: Tsuyoshi Yamamoto, Ota (JP)

(73) Assignee: Sanyo Electric Co., Ltd., Osaka (JP)

( * ) Notice: Subject to any disclaimer, the term of this patent is extended or adjusted under 35 U.S.C. 154(b) by 398 days.

(21) Appl. No.: 09/709,086

(22) Filed: Nov. 8, 2000

(30) Foreign Application Priority Data

Nov. 9, 1999 (JP) ............................................. 11-318493

(51) Int. Cl.⁷ .................................................. G11B 7/00
(52) U.S. Cl. .................. 369/116; 369/47.53; 369/53.37
(58) Field of Search ........................... 369/53.11, 53.26, 369/53.27, 53.37, 47.5, 47.51, 47.52, 47.53, 116, 106

(56) References Cited

U.S. PATENT DOCUMENTS

| | | | | |
|---|---|---|---|---|
| 4,858,220 A | * | 8/1989 | Funada | 369/116 |
| 5,005,164 A | * | 4/1991 | Sakamoto et al. | 369/116 |
| 5,185,733 A | * | 2/1993 | Finkelstein et al. | 369/47.52 |
| 5,231,625 A | * | 7/1993 | Hokozono et al. | 369/106 |
| 5,274,622 A | * | 12/1993 | Kono | 369/116 |
| 6,418,102 B1 | * | 7/2002 | Suga | 369/47.53 |

FOREIGN PATENT DOCUMENTS

| | | |
|---|---|---|
| EP | 0-348233 | 12/1989 |
| JP | 02-165424 | 6/1990 |
| JP | 04-090143 | 3/1992 |
| JP | 05-006565 | 1/1993 |
| JP | 06-076288 | 3/1994 |
| JP | 06-309669 | 11/1994 |

\* cited by examiner

*Primary Examiner*—Thang V. Tran
(74) *Attorney, Agent, or Firm*—Hogan & Hartson, LLP

(57) ABSTRACT

When setting an optimal laser output, an optimal initial recording output data to be supplied to a laser driving circuit (2) is obtained through a control operation of a laser control circuit. The optimal initial recording output data is then stored. When switching from a reproducing mode to a recording mode, the optimal initial recording output data designated through the setting of the optimal laser output is supplied to the laser driving circuit (2) while feedback control is prohibited. In this way, recording can begin immediately after switching from the reproducing mode to the recording mode.

5 Claims, 3 Drawing Sheets

LASER OUTPUT CONTROL IN OPTICAL DISK RECORDING/REPRODUCING DEVICE

BACKGROUND OF THE INVENTION

1. Field of the Invention

The present invention relates to an optical disk recording/reproducing device for recording a signal on a disk using a laser irradiated from an optical pickup, and for reproducing a signal recorded on a disk using a laser.

2. Description of the Background Art

Disk players which use an optical pickup to read signals recorded on a disk are widely used. Recently, optical disk recording/reproducing devices have also become commercially available. These devices are designed for performing, in addition to reproduction, recording of signals on a disk by a laser irradiated from an optical pickup.

In a typical optical disk recording/reproducing device, data is recorded by using a laser to create a series of pits on a disk. When the laser output is inappropriate, the pit size becomes too large or too small. To prevent this problem, a disk used in an optical disk recording/reproducing device includes a trial writing region on the innermost track side. After recording a signal in the trial writing region, the signal is reproduced and detected, and the laser output for recording is set according to the detected signal. This technique is disclosed, for example, in Japanese Patent Laid-Open Publication No. Hei 6-76288.

Recording of a signal on a disk is executed by alternately switching the level of the laser output from a laser element between a recording level and a reproducing level. A signal is recorded on a disk by creating a pit in a signal track on the disk using such a laser having an output level for recording, and the pit is formed in a prescribed size. The signal recording operation is executed while rotating the disk at a predetermined constant linear velocity. In some recently commercialized optical disk recording/reproducing devices, the linear velocity for the rotation during signal recording operation can be increased to several times the predetermined linear velocity.

When switching from the reproducing mode to the recording mode in an optical disk recording/reproducing device allowing re-recording, the switching speed is required to be correspondingly high in accordance with the servo operation of the servo circuit integrated in the laser driving circuit. As the recording speed of signals on the disk is increased, the switching operation from the reproducing mode to the recording mode must be executed in a shorter time. To accomplish this, it is necessary that recording be immediately restarted at an optimal laser output, especially when recording is resumed after an interruption.

To perform the switching operation in a reduced time, the method of increasing the gain of the servo circuit may be adopted. However, this method generates overshoot in the recording waveform at the start of recording. In addition to requiring time to start an optimal recording operation, there exists the problem of generation of abnormality in the recording signal.

SUMMARY OF THE INVENTION

An object of the present invention is to provide a laser output control circuit overcoming the above problems for use in an optical disk recording/reproducing device.

According to the present invention, there is provided an optical disk recording/reproducing device in which an optimal laser output is set while recording a test signal in a trial writing region provided on a disk, the device comprising a storage unit for storing data of the optimal laser output obtained when the optimal laser output is set, wherein, during a normal recording operation, a laser output signal is generated according to a laser output feedback control signal, and, when transferring from a reproducing operation to a recording operation, the feedback control is prohibited while the laser output signal is generated based on the optimal laser output data stored in the storage unit.

In the present device, the feedback control is prohibited when transferring from a reproducing operation to a recording operation, and the laser output signal is generated based on the previously stored optimal laser output data. In this way, the recording operation can immediately be started after the transfer. If the laser output signal is generated under feedback control after transfer in the same manner as during a normal recording operation, recording cannot be started until the feedback control stabilizes. However, according to the present invention as described above, the transfer from the reproducing mode to the recording mode can be executed in an extremely short time, allowing the transfer to be smoothly performed in accordance with the increased disk recording speed.

Further, generation of overshoot in the recording waveform can be prevented because the gain of the feedback loop, namely, the servo circuit, need not be increased merely to speed up the start of recording. The optimal laser output data used at the time of transfer is the data obtained during a recording into the trial writing region of the disk. Using this data, execution of recording in an appropriate recording condition can begin immediately after the transfer.

Moreover, because the present invention enables instantaneous transfer to the recording mode, with the present invention, recording can be smoothly performed in a connecting portion in which a signal is to be recorded immediately in succession to a previously recorded signal after an interruption in recording.

According to a further aspect of the present invention, in an optical disk recording/reproducing device as described above, while the laser output signal is generated from the optimal laser output data, the feedback control is prohibited when transferring from the reproducing operation to the recording operation, and the prohibition of the feedback control is canceled after a predetermined time period.

In this way, the feedback control is resumed after a predetermined time period subsequent to the transfer from the reproducing operation to the recording operation. After completing the quick transfer from the reproducing mode to the recording mode, recording operation can be performed in a stable manner through the feedback control.

In another aspect of the present invention, in an optical disk recording/reproducing device such as those described above, the feedback control signal is a monitor signal of a laser irradiated by a laser element. The device further comprises a comparator circuit for comparing the monitor signal to the optimal laser output data, an initial recording data storage unit for storing, as an initial recording data, a data obtained through amplification of the optimal laser output data by the comparator circuit, and an output switch for supplying, to a laser driving circuit for driving the laser element, an output from the comparator circuit and an output from the initial recording data storage unit in a selective manner by switching between the two outputs.

In a further aspect of the present invention, an optical disk recording/reproducing device such as those described above further comprises a comparative output control switch which opens and closes to switch between short-circuit and insulation between two ends of a capacitor provided in a feedback path of the comparator circuit. When operation is transferred from the reproducing operation to the recording operation, the output switch is switched to the side for outputting from the initial recording data storage unit, and the comparative output control switch is closed to short-circuit the two ends of the capacitor.

According to still another aspect of the present invention, in an optical disk recording/reproducing device such as those described above, the feedback control signal is a monitor signal of a laser irradiated by a laser element. The device further comprises a comparator circuit for comparing the monitor signal to the optimal laser output data from the storage unit, and a comparative output control switch which opens and closes to switch between short-circuit and insulation between two ends of a capacitor provided in a feedback path of the comparator circuit. When operation is transferred from the reproducing operation to the recording operation, the comparative output control switch is closed to short-circuit the two ends of the capacitor, thereby allowing the comparator circuit to output said optimal laser output data obtained from the storage unit.

By employing a switch for controlling the circuit state between the two ends of the capacitor, recording can be started using the optimal laser output data at the point operation is transferred from the reproducing operation to the recording operation. In addition, this simple arrangement allows a smooth transfer back to the feedback control.

More specifically, when transferring from the non-feedback control mode to the feedback control mode, the comparative output control switch is switched from the closed state to the open state. Immediately after the switching to the open state, no charge is accumulated in the capacitor. The comparator circuit therefore continues outputting the stored optimal laser output data being input to the comparator circuit. When the capacitor is charged to a predetermined level, the comparator circuit outputs a result of comparison between the feedback control signal and the optimal laser output data. During the period until the capacitor becomes charged to a predetermined level, recording operation can be performed in a stable manner using the optimal laser output data. In this way, use of the capacitor prevents an immediate transfer back to the feedback control mode which may cause a sudden change in the laser output, and achieves a smooth transfer back to the feedback control mode.

DESCRIPTION OF THE PREFERRED EMBODIMENTS

Figure 1:
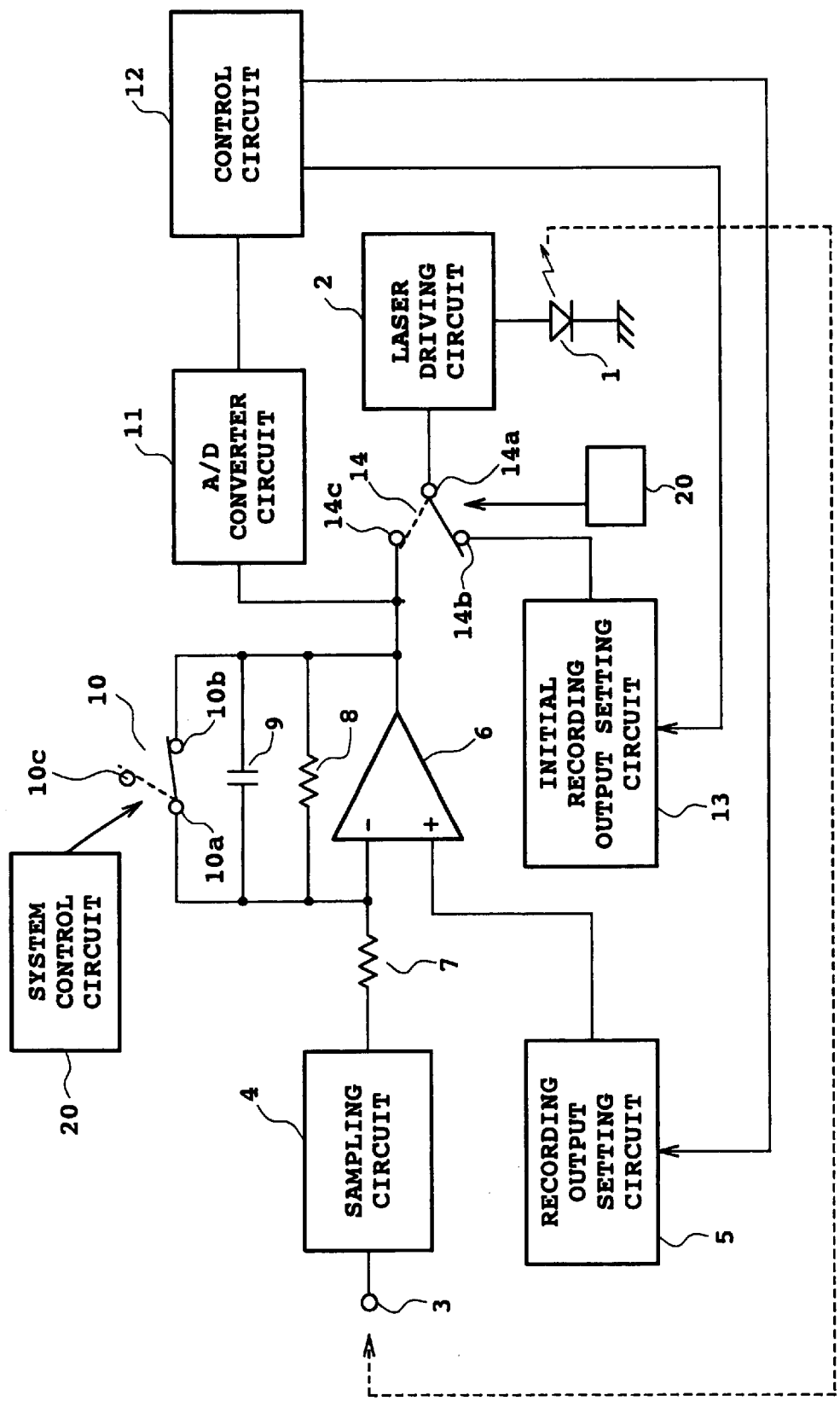
FIG. 1 is a circuit diagram illustrating an embodiment of an optical disk recording/reproducing device according to the present invention.
Figure 2:
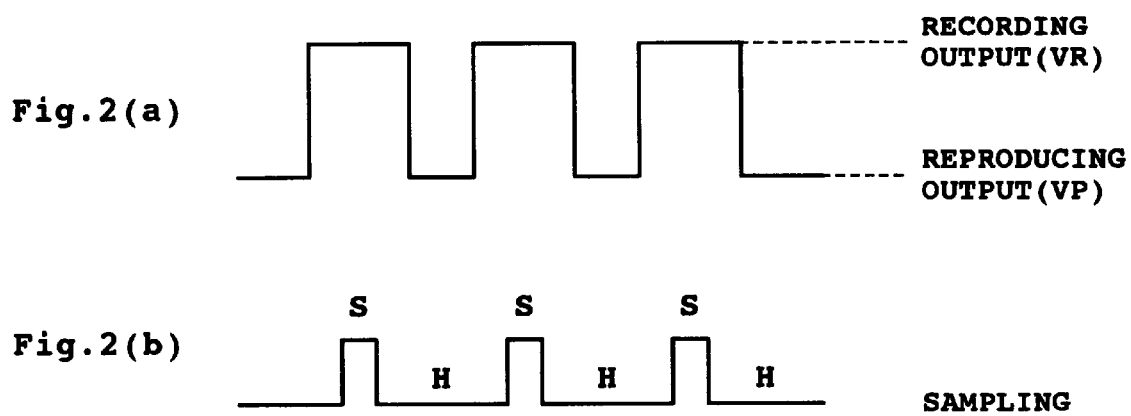
FIGS. 2(a) and 2(b) are waveform diagram for explaining an operation of the present invention.
Figure 3:
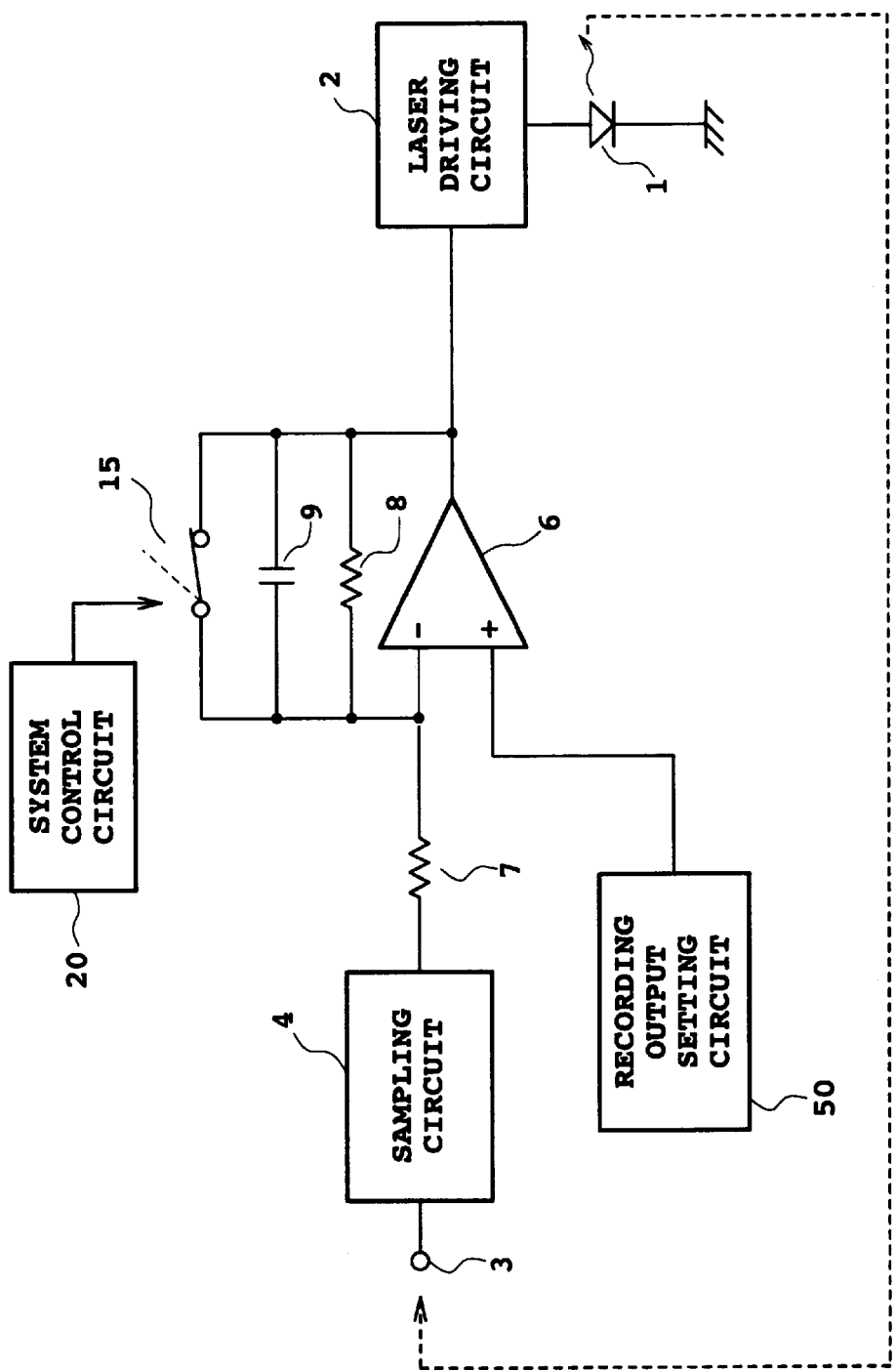
FIG. 3 is a circuit diagram illustrating another embodiment of an optical disk recording/reproducing device according to the present invention.

FIG. 1 is a circuit diagram illustrating an optical disk recording/reproducing device according to a first preferred embodiment of the present invention. FIGS. 2(a) and 2(b) are waveform diagram for explaining an operation of the present invention. FIG. 3 is a circuit diagram illustrating an optical disk recording/reproducing device according to a second preferred embodiment of the present invention.

In FIG. 1, numeral 1 denotes a laser diode incorporated in an optical pickup. The laser diode 1 serves as a laser element for irradiating a laser, and is connected so as to be driven by a current supplied from a laser driving circuit 2. During a recording operation, the laser driving circuit 2 supplies to the laser diode 1 a pulse signal as shown in FIG. 2(a) configured to include a recording output VR and a reproducing output VP.

Numeral 3 denotes a monitor signal input terminal. The monitor signal input terminal 3 receives input of a monitor signal obtained from a monitor diode (not shown) provided for monitoring the laser output by the laser diode 1. Numeral 4 denotes a sampling circuit for sampling the level of the recording output portion of the laser output by the laser diode 1. The sampling circuit 4 samples the level of the recording output and retains that level during the period of the reproducing output. In FIG. 2(b), S denotes a sampling operation period, while H denotes a sample retaining period.

Numeral 5 denotes a recording output setting circuit for storing data of an optimal recording output designated during a recording of a test signal into a trial writing region provided in a disk, and for outputting a reference signal based on this data. Numeral 6 denotes a comparator circuit. The negative terminal of the comparator circuit 6, which serves as the comparison signal input terminal, is connected with an output terminal of the sampling circuit 4 via a resistor 7. The positive terminal of the comparator circuit 6, which serves as the reference signal input terminal, is connected with an output terminal of the recording output setting circuit 5. A feedback circuit is provided between the comparison signal input terminal and the output terminal of the comparator circuit 6. In the feedback circuit, a resistor 8 and a capacitor 9 are connected in parallel. Numeral 10 is a recording switch including a movable terminal 10a connected to the comparison signal input terminal, a fixed terminal 10b connected to the output terminal of the comparator circuit 6, and a fixed open terminal 10c.

Numeral 11 denotes an A/D converter circuit which receives input of a signal from the output terminal of the comparator circuit 6, and converts the signal into a digital signal. Numeral 12 denotes a control circuit which receives input of the digital signal converted by the A/D converter circuit 11. When an optimal laser output is designated through the recording of a test signal in the trial writing region provided in the disk, the control circuit 12 functions to store the corresponding data signal into the recording output setting circuit 5. Numeral 13 denotes an initial recording output setting circuit. When the optimal laser output is set by the trial recording operation, the initial recording output setting circuit 13 stores an output from the comparator circuit 6 as an optimal initial recording output (optimal laser output data), and outputs the stored data in response to a control instruction from the control circuit 12.

Numeral 14 denotes a recording start switch (output switch). The recording start switch 14 includes a terminal 14a connected to the input terminal of the laser driving circuit 2, and a fixed terminal 14b connected to the output terminal of the initial recording output setting circuit 13. The fixed terminal 14b is coupled to the terminal 14a for a predetermined time period at the start of a recording operation. The recording start switch 14 further includes a fixed terminal 14c connected to the output terminal of the comparator circuit 6. The fixed terminal 14c is coupled to the terminal 14a subsequent to a predetermined time period after the start of a recording operation.

In the above arrangement, when the device is transferred into the mode for recording a data signal into a recording region of a disk, the recording start switch 14 is switched to the state indicated by a solid line in FIG. 1 for a predetermined time period, thereby connecting the output of the initial recording output setting circuit 13 (terminal 14b) and the input of the laser driving circuit 2 (terminal 14a). After the predetermined time period, the switch 14 is resumed to the state indicated by a dotted line in FIG. 1 in which the terminal 14a is in contact with the fixed terminal 14c. The "predetermined time period" during which the switch 14 is switched is designated, for example, to a time period required for the recording operation using the optimal laser output described below to stabilize to a certain degree. The time period may be measured by, for example, the system control circuit 20. Further, the device is configured such that, when the recording start switch 14 is switched to the state indicated by a dotted line, the recording switch 10 is also switched to the state indicated by a dotted line in FIG. 1, thereby connecting the terminal 10a and the terminal 10c.

According to the above arrangement, data for realizing an optimal recording laser output is set and stored in the recording output setting circuit 5 and the initial recording output setting circuit 13 through a recording operation of a test signal in the trial writing region provided in the disk on its inner periphery. Explanation of the operation for setting the optimal laser output will not be made here because the setting operation can be performed using a conventional technique. The recording output setting circuit 5 and the initial recording output setting circuit 13 obtain and store data for realizing an optimal recording laser output. An output obtained through amplification by the comparator circuit 6 is supplied to the initial recording output setting circuit 13 via the A/D converter circuit 11 and the control circuit 12. The data stored in the initial recording output setting circuit 13 therefore is an output from the recording output setting circuit 5 amplified by the comparator circuit 6.

While in the mode for recording a data signal into a recording region of a disk, the recording switch 10 and the recording start switch 14 are both in the state indicated by dotted lines, and a pulse signal having a waveform shown in FIG. 2(a) is output from the laser driving circuit 2 to the laser diode 1. While the recording operation is performed, the sampling circuit 4 executes the sampling and retaining operations with respect to the recording output. The obtained sample signal (feedback control signal) has a waveform as shown in FIG. 2(b). This signal is compared in the comparator circuit 6 to a reference signal output from the recording output setting circuit 5. A resulting comparison output signal is supplied to the laser driving circuit 2 via the recording start switch 14 (via terminals 14c and 14a). In this way, the recording output of the drive signal supplied to the laser diode 1 is controlled to an optimal state. More specifically, a monitor signal obtained from the monitor diode provided for monitoring the laser irradiated by the laser diode 1 is input to the monitor signal input terminal 3. A signal obtained by sampling this input signal is compared to the reference signal output from the recording output setting circuit 5 by the comparator circuit 6. By supplying a resulting comparison output signal to the laser driving circuit 2, the control for maintaining the laser output to an optimal state, the so-called servo operation, is executed. In this arrangement, the laser output is determined and controlled by a laser control circuit configured with components such as the comparator circuit 6, through use of the signal supplied to the laser driving circuit 2.

It is to be noted that, similarly as during a recording operation into a recording region, the recording switch 10 and the recording start switch 14 are both in the state indicated by dotted lines during setting of the optimal laser output through recording of a test signal into the trial writing region.

Recording of a signal onto a disk is performed as described above. The operation for switching from a reproducing mode to the signal recording mode is next described. According to the present embodiment, when the optical disk recording/reproducing device is transferred from a reproducing mode to a recording mode, the recording start switch 14 is switched to the state indicated by the solid line for a predetermined time period, while the recording switch 10 is also switched to the state indicated by the solid line.

When the recording start switch 14 is switched to the state indicated by the solid line, the laser driving circuit 2 is no longer supplied with a control signal from the comparator circuit 6, but is supplied with the optimal initial recording output stored in the initial recording output setting circuit 13. As a result, from the very start of the recording immediately after transferring to the recording mode, the laser driving circuit 2 supplies to the laser diode 1 a driving signal which realizes a laser output for executing an optimal recording operation. Furthermore, while the above operation is performed, the two ends of the capacitor 9 connected in the feedback circuit of the comparator circuit 6 are short-circuited by the recording switch 10.

After a predetermined time period subsequent to the transfer to the recording mode, the recording start switch 14 is switched back to the state indicated by the dotted line, while the recording switch 10 is also switched back to the state indicated by the dotted line. When the recording start switch 14 is switched back, the laser driving circuit 2 is supplied with an output signal from the comparator circuit 6 constituting the laser control circuit.

When the recording switch 10 is switched back to the state indicated by the dotted line at the same timing as the switch 14, the short-circuit of the capacitor 9 connected within the feedback circuit of the comparator circuit 6 is released. The switching operations as described above are completed in the optical disk recording/reproducing device after the transfer to the recording mode. However, at the time immediately after the switching back of the recording switch 10, no charge is yet accumulated in the capacitor 9. Accordingly, a signal based on the reference signal output from the recording output setting circuit 5 is supplied from the output terminal of the comparator circuit 6.

The driving current supplied to the laser diode 1 therefore has a current value corresponding to the reference signal output from the recording output setting circuit 5. As a result, the output of the laser irradiated by the laser diode 1 is set to the optimal recording level. More specifically, when the recording start switch 14 is switched back to the state indicated by the dotted line, the output signal from the comparator circuit 6, which is the signal to be supplied to the laser driving circuit 2, is controlled to a signal corresponding to the reference signal output from the recording output setting circuit 5. This signal is identical to the output signal from the initial recording output setting circuit 13. Accordingly, the level of the signal supplied to the laser driving circuit 2 remains unchanged when the recording start switch 14 is switched back to the state indicated by the dotted line, suppressing alteration of the output of the laser irradiated by the laser diode 1.

After completion of the switching operations as described above, output adjustment of the laser irradiated by the laser diode 1 is conducted through the control operation according to the monitor signal obtained from the monitor diode, namely, the servo operation. According to the transfer operation to the recording mode as described above, by initially setting the laser irradiated by the laser diode 1 to an optimal level stored during recording into the trial writing region, the servo operation for controlling the laser output can be smoothly started. The transfer operation from the reproducing mode to the recording mode can thereby be executed in a reduced time, allowing the transfer to be smoothly performed in accordance with the increased disk recording speed.

The operation of the embodiment shown in FIG. 1 is as described above. Another embodiment shown in FIG. 3 is next explained. In FIG. 3, components identical to those in FIG. 1 are denoted by the same reference numerals.

In this embodiment, the recording output setting circuit 50 serves the functions of both the recording output setting circuit 5 and the initial recording output setting circuit 13 shown in FIG. 1. As can be seen in FIG. 3, a recording control switch 15 identical to the switch 10 of FIG. 1 is provided between the output terminal and the comparison signal input terminal of the comparator circuit 6. The system control circuit 20 controls the switching operation of the recording control switch 15. Specifically, the recording control switch 15 is opened during a normal recording operation and during recording of a test signal into the trial writing region (i.e., the optimal laser output setting operation). When transferring from the reproducing mode to the recording mode, the switch 15 is closed and maintained closed for a predetermined time period.

In the above arrangement, when operation of the optical disk recording/reproducing device is transferred from the reproducing mode to the recording mode, the recording control switch 15 is closed When the recording control switch 15 is closed, the output terminal of the comparator circuit 6 outputs a signal based on the data designated in the recording output setting circuit 50, that is, a signal which realizes an optimal laser output according to the data set during the recording into the trial writing region. This signal is supplied to the laser driving circuit 2. Accordingly, a laser having an optimal output is irradiated by the laser diode 1.

At the instant immediately after executing the transfer to the recording mode, the recording control switch 15 is closed as described above. Subsequently, after a predetermined time has elapsed, the recording control switch 15 is opened. When the time the recording control switch 15 is opened, no charge is accumulated in the capacitor 9 because the two ends of the capacitor 9 had been short-circuited by the recording control switch 15. The output terminal of the comparator circuit 6 therefore outputs the reference signal supplied from the recording output setting circuit 50. When the capacitor 9 becomes charged, the recording operation transfers to the state in which the servo operation is performed for controlling the output of the laser irradiated by the laser diode 1.

In the embodiment shown in FIG. 3, when the transfer to the recording mode is executed, the switch 15 is closed, as described above, and, when the recording control switch 15 is subsequently opened after a predetermined time, the output of the laser irradiated by the laser diode 1 is adjusted by the control operation based on the monitor signal obtained from the monitor diode, namely, the servo operation. By executing the transfer to the recording mode in this way, the laser irradiated by the laser diode 1 can be output at an optimal level from the very beginning of recording, and the servo operation for controlling the laser output can smoothly be started. The transfer operation from the reproducing mode to the recording mode can thereby be executed in a reduced time, allowing the transfer to be smoothly performed in accordance with the increased disk recording speed.

The recording switch 10 and the recording start switch 14 shown in FIG. 1 and the recording control switch 15 shown in FIG. 3 comprise electronic switches and can be switched very quickly. While, in the above explanation, the data for realizing an optimal laser output is stored in the recording output setting circuit 5 (50) and the initial recording output setting circuit 13, a memory means for storing various data may alternatively be provided in the control circuit 12. In that case, the recording output setting circuit 5 (50) and the initial recording output setting circuit 13 may be configured to output a reference signal generated based on data output from the control circuit 12.

What is claimed is:

1. An optical disk recording/reproducing device in which an optimal laser output is set while a test signal is recorded in a trial writing region provided on a disk, said device comprising:

a storage unit for storing data of said optimal laser output obtained when said optimal laser output is set; wherein during a normal recording operation, a laser output signal is generated according to a laser output feedback control signal, and when operation is transferred from a reproducing operation to a recording operation, said feedback control is prohibited while the laser output signal is generated based on said optimal laser output data stored in said storage unit.

2. An optical disk recording/reproducing device as claimed in claim 1, wherein when operation is transferred from the reproducing operation to the recording operation, the laser output signal is generated from said optimal laser output data while said feedback control is prohibited, and the prohibition of said feedback control is canceled after a predetermined time period has elapsed.

3. An optical disk recording/reproducing device as claimed in claim 1, wherein said feedback control signal is a monitor signal of a laser irradiated by a laser element, said device further comprising:

a comparator circuit for comparing said monitor signal to said optimal laser output data;

an initial recording data storage unit for storing, as an initial recording data, a data obtained through amplification of said optimal laser output data by said comparator circuit; and an output switch for supplying, to a laser driving circuit for driving the laser element, an output from said comparator circuit and an output from said initial recording data storage unit in a selective manner by switching between said two outputs.

4. An optical disk recording/reproducing device as claimed in claim 3, further comprising:

a comparative output control switch which opens and closes to switch between short-circuit and insulation between two ends of a capacitor provided in a feedback path of said comparator circuit; wherein when transferring from the reproducing operation to the recording operation, said output switch is switched to a position for outputting from said initial recording data storage unit, and said comparative output control switch is closed to short-circuit the two ends of said capacitor.

5. An optical disk recording/reproducing device as claimed in claim 2, wherein
said feedback control signal is a monitor signal of a laser irradiated by a laser element,
said device further comprising:
a comparator circuit for comparing said monitor signal to said optimal laser output data from said storage unit; and
a comparative output control switch which opens and closes to switch between short-circuit and insulation between two ends of a capacitor provided in a feedback path of said comparator circuit; wherein
when transferring from the reproducing operation to the recording operation, said comparative output control switch is closed to short-circuit the two ends of said capacitor, thereby allowing said comparator circuit to output said optimal laser output data obtained from said storage unit.

* * * * *